United States Patent
Eckert et al.

(10) Patent No.: US 8,259,626 B2
(45) Date of Patent: Sep. 4, 2012

(54) TELECOMMUNICATION SYSTEM AND METHOD FOR GENERATING AND SENDING A TELECOMMUNICATION SESSION MESSAGE

(75) Inventors: Michael Eckert, Braunschweig (DE); Andreas Schmidt, Braunschweig (DE); Norbert Schwagmann, Lehe (DE)

(73) Assignee: Intel Mobile Communications GmbH, Neubiberg (DE)

( * ) Notice: Subject to any disclaimer, the term of this patent is extended or adjusted under 35 U.S.C. 154(b) by 495 days.

(21) Appl. No.: 11/475,441

(22) Filed: Jun. 26, 2006

(65) Prior Publication Data

US 2007/0008914 A1  Jan. 11, 2007

(30) Foreign Application Priority Data

Jun. 24, 2005 (DE) .......... 10 2005 029 436
Aug. 19, 2005 (DE) .......... 10 2005 039 366

(51) Int. Cl.
*H04B 7/005* (2006.01)
(52) U.S. Cl. ...................................... 370/278
(58) Field of Classification Search ................ 370/352, 370/401, 278; 379/318; 455/445
See application file for complete search history.

(56) References Cited

U.S. PATENT DOCUMENTS

| | | | |
|---|---|---|---|
| 6,671,518 B2 * | 12/2003 | Harris et al. | 455/518 |
| 6,735,621 B1 * | 5/2004 | Yoakum et al. | 709/218 |
| 7,197,328 B2 * | 3/2007 | Hart et al. | 455/522 |
| 7,269,146 B2 * | 9/2007 | Pecen et al. | 370/312 |
| 7,283,489 B2 * | 10/2007 | Palaez et al. | 370/277 |
| 7,471,943 B2 * | 12/2008 | Chun et al. | 455/410 |
| 7,689,822 B2 * | 3/2010 | Maggenti et al. | 713/151 |
| 2003/0154249 A1 | 8/2003 | Crockett et al. | |
| 2004/0048627 A1 | 3/2004 | Olvera-Hernandez | |

FOREIGN PATENT DOCUMENTS

| | | |
|---|---|---|
| DE | 100 02 030 A1 | 7/2001 |
| EP | 1 613 009 A1 | 1/2006 |
| WO | WO-2004/105414 A1 | 12/2004 |
| WO | WO-2005/086972 A2 | 9/2005 |
| WO | WO-2006/011731 A1 | 2/2006 |

OTHER PUBLICATIONS

Open Mobile Alliance: "Push to Talk over Cellular (Poc)—Architecture", Draft Version 1.0 (Nov. 2004).
Open Mobile Alliance, OMA-REQ-2004-1018-PoC2-PoC-Box, PoC-2 Use Cases (Nov. 2004).
3rd Generation Partnership Project, Technical Specification Group Terminals, Techincal Realization of the Short Message Service (SMS) Release 6, 3GPP TS 23.040, Version 6.5.0 v6.5.0 (2004).
Open Mobile Alliance, PoC User Plane Version 1, Draft Version 1.0.10 (Nov. 2004).
Open Mobile Alliance, OMA-REQ-PoC2-2005-0113-media-burst-life-time (Aug. 2005).

* cited by examiner

*Primary Examiner* — Chandrahas Patel
(74) *Attorney, Agent, or Firm* — Dickstein Shapiro LLP

(57) ABSTRACT

A telecommunication system, method, and terminal, the terminal having a telecommunication session message generation unit adding to at least one generated telecommunication session message a message validity information item indicating whether or until when the telecommunication session message or another telecommunication session message identified in the telecommunication session message is valid.

30 Claims, 3 Drawing Sheets

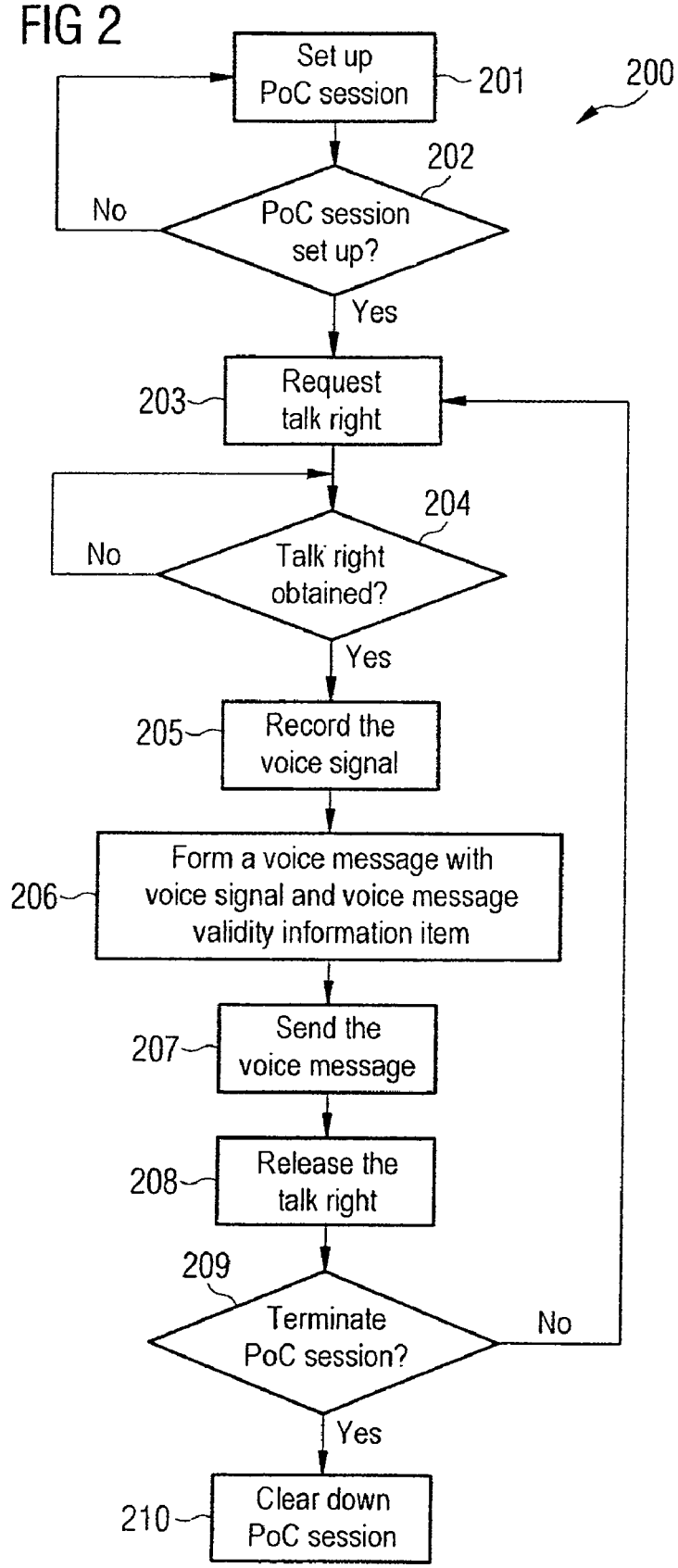

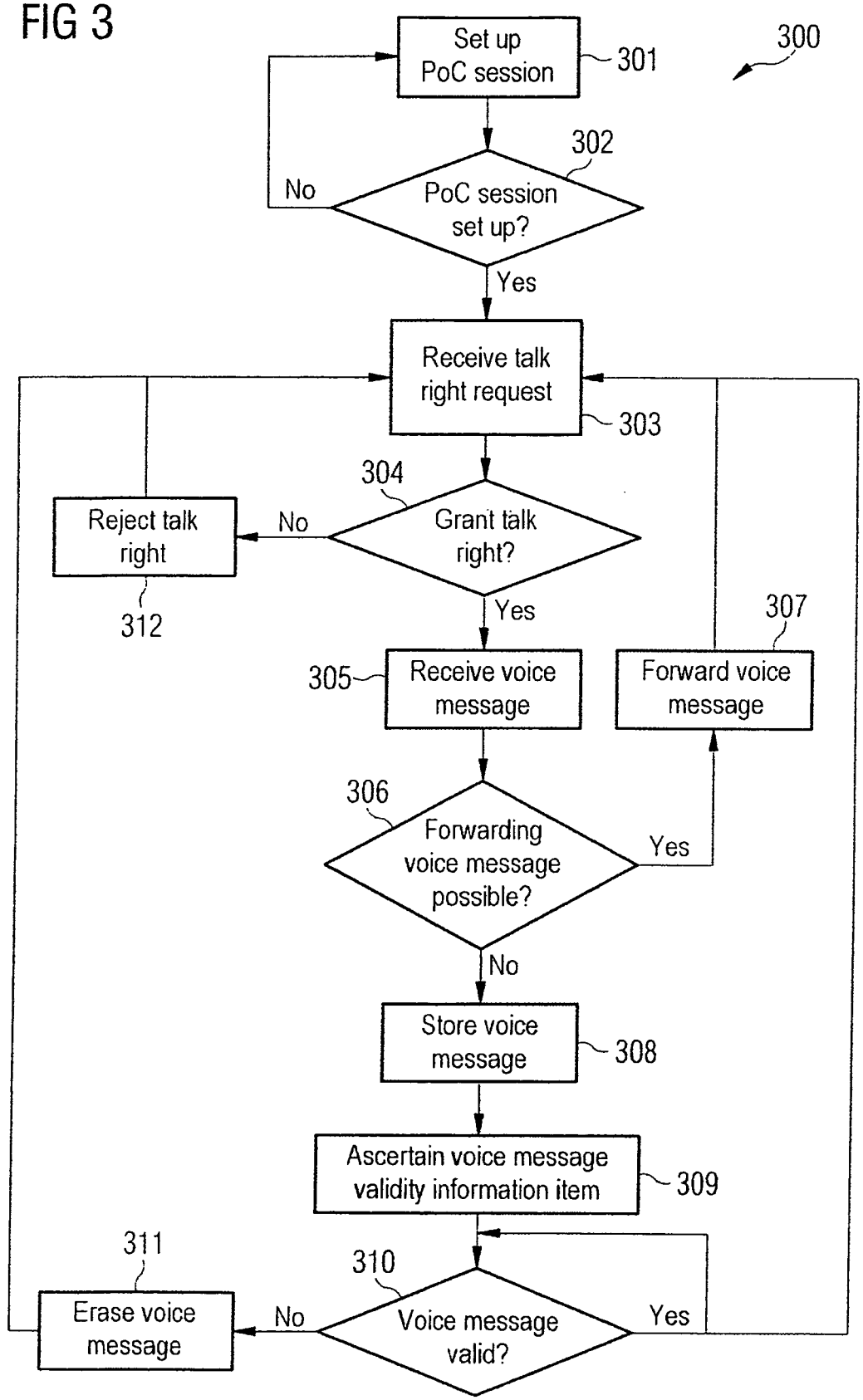

TELECOMMUNICATION SYSTEM AND METHOD FOR GENERATING AND SENDING A TELECOMMUNICATION SESSION MESSAGE

RELATED APPLICATIONS

This application claims priority to DE 10/2005/029/436.7-31 filed June 24, and DE 10/2005/039 366.7-31 filed Aug. 19, 2005, the entirety of both of which are incorporated herein by reference.

FIELD OF THE INVENTION

The invention relates to a telecommunication terminal, a telecommunication system, a telecommunication session server unit, a method for generating and sending a telecommunication session message, a method for managing a telecommunication session voice message, computer-readable storage media and also computer program elements.

BACKGROUND OF THE INVENTION

Push-to-Talk-over-Cellular allows a user or telecommunication terminal to transmit voice to one or more receivers simultaneously using a half-duplex method when the receiver or a plurality of receivers has/have been selected and when a Push-to-Talk-over-Cellular key (PoC key) provided specifically for this purpose on the telecommunication terminal has been pressed.

A half-duplex method is understood to mean a transmission method in which only one unidirectional useful data transmission can only take place at a time, i.e. for example only the sender can speak and the receivers cannot interrupt him. In this case, the voice data, also called "talk bursts", are actually distributed over the telecommunication network while the voice data are being spoken and while the voice data are being transmitted from the sender telecommunication terminal. Thus, from the point of view of the user, Push-to-Talk-over-Cellular is similar to conventional CB radio, but with the extension that the sender is able to speak to receivers throughout the world that are able to be reached using the communications engineering of at least one mobile radio communication network. A prerequisite in this case is that the receiver or the receivers, i.e. the respective receiver telecommunication terminals, are also registered in the mobile radio communication network at this time, in other words are "online".

Conventionally, the flow of signalling takes the following appearance:

Subscriber A, i.e. the subscriber on the sender telecommunication terminal, presses the button provided for activating PoC on the sender telecommunication terminal.

Following an appropriate query message which the sender telecommunication terminal uses to ask the PoC server computer for a talk right and which message is now transmitted to the PoC server computer, the sender telecommunication terminal might receive notification from the PoC server computer that subscriber B cannot be reached, and is asked whether it wishes to leave a message.

Subscriber A can ignore this message or can again press a button (key) provided for the functionality below on the telecommunication terminal, for example the PoC button (PoC key), and hence activate that his message is recorded in the PoC box of subscriber B.

After a time, subscriber B can be reached again, which the PoC communication service and particularly the PoC server computer can ascertain by monitoring the "Presence Info" parameter of subscriber B, for example.

The PoC communication service now initiates a 1-to-1 PoC session with subscriber B and notifies subscriber B that a stored message from subscriber A is stored in the PoC box. The stored message is then transmitted to subscriber B, i.e. to the receiver telecommunication terminal.

Subscriber B can then, having received the message from the PoC server computer, press his PoC button (PoC key) on the receiver telecommunication terminal so as implicitly to set up a 1-to-1 PoC communication session with subscriber A.

SUMMARY OF THE INVENTION

According to one embodiment of the invention, a telecommunication terminal includes:
  a telecommunication session unit setting up and/or controlling a half-duplex telecommunication session,
  a telecommunication session message generation unit generating a telecommunication session message,
  a telecommunication session message transmission unit sending the telecommunication session message,
  wherein the telecommunication session message generation unit is adding to at least one telecommunication session message which is to be generated a message validity information item indicating whether or until when the telecommunication session message or another telecommunication session message identified in the telecommunication session message is valid.

SHORT DESCRIPTION OF THE FIGURES

In the figures:

FIG. 2 shows a flow chart of the steps which are performed in a sender telecommunication terminal in the course of a PoC communication link based on an exemplary embodiment of the invention;

FIG. 3 shows a flowchart of the steps which are performed in line with an exemplary embodiment of the invention in a PoC server unit;

DETAILED DESCRIPTION

Figure 1:
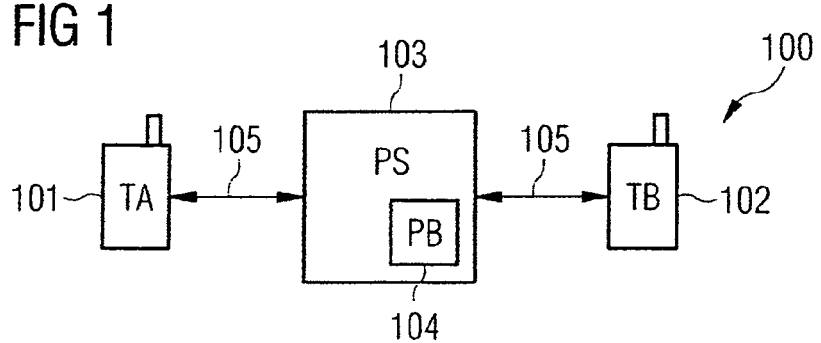
FIG. 1 shows a block diagram of a simplified architecture for a PoC telecommunication system based on an exemplary embodiment of the invention.

A telecommunication terminal has a telecommunication session unit for setting up and/or controlling a half-duplex telecommunication session. In addition, the telecommunication terminal contains a telecommunication session message generation unit generating a telecommunication session message. Furthermore, a telecommunication session message transmission unit is provided sending the telecommunication session message. The telecommunication session message generation unit is adding to at least one telecommunication session message which is to be generated a message validity information item indicating whether or until when the telecommunication session message or another telecommunication session message identified in the telecommunication session message is valid.

According to one embodiment of the invention a telecommunication system includes at least one telecommunication terminal as described above as well as a receiver for receiving and storing the telecommunication session message.

The receiver may be a half-duplex telecommunication session server unit and may provide a half-duplex telecommunication session between the telecommunication terminal and a further telecommunication terminal.

According to one embodiment of the invention, a telecommunication session server unit is provided which provides a telecommunication session between a plurality of telecommunication terminals including a control unit controlling a half-duplex telecommunication session between a plurality of telecommunication terminals, a receiver unit receiving a telecommunication session message, a memory storing the received telecommunication session message, with the telecommunication session message containing a message validity information item indicating whether or until when the telecommunication session message or another telecommunication session message identified in the telecommunication session message is valid, and also a checking unit checking whether the telecommunication session message or the other telecommunication session message is valid. By way of example, the checking unit erases the telecommunication session message or the other telecommunication session message if the case indicated in the message validity information item has arisen, for example if the telecommunication session message or the other telecommunication session message is invalid.

A method for generating and sending a telecommunication session message in the course of a half-duplex telecommunication session between a plurality of telecommunication terminals, performed by a telecommunication terminal from the plurality of telecommunication terminals, according to one embodiment of the invention has the following steps:

A telecommunication session message is generated, the telecommunication session message having a message validity information item added to it indicating whether or until when the telecommunication session message or another telecommunication session message identified in the telecommunication session message is valid.

The telecommunication session message is sent.

According to another method for generating and sending a telecommunication session message in the course of a half-duplex telecommunication session between a plurality of telecommunication terminals has the following steps performed by a telecommunication terminal from the plurality of telecommunication terminals:

a telecommunication session message is generated, the telecommunication session message having a message validity information item added to it indicating whether or until when the telecommunication session message or another telecommunication session message identified in the telecommunication session message is valid, the telecommunication session media message is sent.

A method for managing a telecommunication session message in the course of a half-duplex telecommunication session between a plurality of telecommunication terminals according to a further embodiment of the invention involves a received telecommunication session message being stored, with the telecommunication session message containing a message validity information item indicating whether or until when the telecommunication session message or another telecommunication session message identified in the telecommunication session message is valid. The message validity information item is ascertained from the telecommunication session message, and the message validity information item is used to check whether the telecommunication session message or the other telecommunication session message is valid. By way of example, if the telecommunication session media message or the other telecommunication session message is invalid and needs to be erased, for example, then the telecommunication session message is erased.

In addition, a computer-readable storage medium is provided which stores a computer program for the purpose of generating and sending a telecommunication session message in the course of a half-duplex telecommunication session between a plurality of telecommunication terminals, where the computer program performs the above-described steps of the relevant method when it is executed by a processor. In addition, an appropriate computer program element is provided.

A computer-readable storage medium is also provided which stores a computer program for the purpose of managing a telecommunication session message in the course of a half-duplex telecommunication session between a plurality of telecommunication terminals, where the computer program has the above-described method steps of the relevant method when it is executed by a processor. In addition, an appropriate computer program element is provided.

The refinements described for the invention relate, as far as it makes sense, to the telecommunication terminal, the telecommunication system, the telecommunication session server unit, the method for generating and sending a telecommunication session message, the method for managing a telecommunication session message, the computer-readable storage media and the computer program elements.

According to one embodiment of the invention a telecommunication terminal, for example the sender telecommunication terminal, is used in a telecommunication session, for example in the course of a half-duplex communication link, to make it possible to stipulate the length of time for which a message formed and sent by the sender telecommunication terminal needs to be valid, in other words needs to be buffered in a receiver, for example, which is used as a voice mail box, for example, and which is in the form of a telecommunication session server unit, for example, or in what case the server unit needs to discard, in other words erase, the respective message.

According to one embodiment of the invention, the validity information is used to stipulate in a message whether a telecommunication session message needs to be erased and hence, by way of example, whether a communication right request message actually needs to be processed further.

The telecommunication session message generation unit may be a telecommunication session media message generation unit generating a telecommunication session media message, the telecommunication session media message being able to contain media data. In this case, the telecommunication session media message is a media burst message, for example.

In addition, the telecommunication session message generation unit may add to at least one telecommunication session message which is to be generated a message validity information item indicating in what case the telecommunication session message or the other telecommunication session message needs to be erased in a receiver of the telecommunication session message or of the other telecommunication session message.

It should be noted that any other further processing of a telecommunication session message recognized to be invalid is also possible. By way of example, a telecommunication session message recognized to be invalid may be stored at a different location.

Media data is to be understood, by way of example, to mean voice data and/or video data and/or text data and/or binary files and/or still-picture data etc.

By way of example, a telecommunication session message has the message validity information item. The message validity information item can specify whether or until when the telecommunication session message or another telecommunication session message identified in the telecommunication session message is valid and, by way of example, in what case the telecommunication session message containing the message validity information item or the other telecommunication session message needs to be erased.

In other words, in line with one embodiment of the invention, in a half-duplex telecommunication session, where the media data can respectively be transmitted only unidirectionally at one respective time, i.e. a receiver of a media message cannot interrupt the sender, for example, in other words a half-duplex telecommunication session involves the communication right having been allocated exclusively to one communication session subscriber and the other telecommunication session subscribers merely being able to receive data, it becomes possible for the transmitted media messages to be buffer-stored if a receiver subscriber cannot be reached, but only until a prescribed erasure criterion has been met, generally only until the respective media messages are valid.

The telecommunication session message may alternatively be a telecommunication session signalling message, for example a telecommunication session communication right request message, based on Push-to-talk-over-Cellular, for example a Talk Burst Request message.

In line with one refinement of the invention, the telecommunication session unit sets up and/or controls a Push-to-Talk telecommunication session, and in this context, by way of example, sets up and/or controls a Push-to-Talk-over-Cellular telecommunication session.

In other words, this embodiment provides for the invention to be used in the course of a Push-to-Talk telecommunication session or a Push-to-Talk-over-Cellular telecommunication session. However, it should be pointed out that any half-duplex telecommunication session is suitable as an application area of the invention.

If the telecommunication session unit is a Push-to-Talk-over-Cellular telecommunication session then the sender telecommunication terminal for a PoC message, i.e. a PoC media message or a PoC Talk Burst from a PoC server unit or a "PoC Box" (generally a PoC voice mail unit), can send information about the validity of the PoC message or of the PoC Talk Burst, for example information about the validity period of the PoC message or of the PoC talk burst.

This means that the sending telecommunication terminal and hence the user of the sender telecommunication terminal is able to configure the validity, for example the validity period of the PoC message which is to be sent (in other words of the PoC talk burst), on the PoC client in his telecommunication terminal.

The message validity information item may therefore be a prescribed period after whose expiry the telecommunication session message (on the receiver, for example in a switching unit or server unit) needs to be erased if an addressed telecommunication terminal intended to receive the telecommunication session message, for example, does not retrieve the telecommunication session message from the server unit.

Alternatively, a spatial criterion, in other words a locality criterion, can be taken into account and checked, this criterion or an information item describing this criterion being added to the telecommunication session message and being used to assess whether or not the telecommunication message in the server unit needs to be erased. By way of example, the locality criterion is to be understood to mean a dependency of the validity of the message on the respective "Geographical Area" in which the receiver is currently located or was located in a prescribable period in the past. One application scenario can be seen in that a message is potentially sent to a plurality of receivers with an instruction which has a spatial reference, for example a request to a receiver who is at a particular location or in a particular area to buy an article or to bring an article to a person or to a nearby location (example: "Whoever is at location X, please bring article Y to person Z at location A").

The criterion may also be a criterion where the telecommunication session message is transmitted or erased on the basis of whether one or more receivers is/are "online", that is to say is/are registered and ready to receive in the mobile radio communication network. By way of example, the criterion may be checked taking into account the presence status of the respective receiver. In other words, this means that the message validity information item is an information item indicating that the telecommunication session message or the other telecommunication session message needs to be erased if a user of an addressed telecommunication terminal is not registered or not ready to receive in the mobile radio telecommunication network.

It should be pointed out that the time information and the spatial information can be taken into account, which allows a plurality of validity information items to be transmitted and taken into account (example: "Whoever is at location X in the next B days, please bring article Y to person Z at location A").

Hence, this refinement of the invention allows the message validity information item to be a spatial information item indicating that the telecommunication session message needs to be erased if an addressed telecommunication terminal is not in the local area indicated by the message validity information item.

In addition, a content-based validity information item may be transmitted and taken into account, alone or combined with one or both types of validity information items described above. By way of example, a content-based validity information item is to be understood to mean an information item which relates to just one group of receivers interested in a particular subject (example: "Anyone with knowledge of the subject UMTS please make contact").

In line with this embodiment of the invention the media message validity information item is a subject-related information item indicating that the telecommunication session message needs to be erased if a user of an addressed telecommunication terminal has no information regarding the indicated subject.

The telecommunication session message generation unit may generate the telecommunication session message on the basis of one of the following communication protocols:
  Real Time Transport Protocol (RTP),
  Real Time Transport Control Protocol (RTCP),
  Binary Floor Control Protocol (BFCP),
  Session Initiation Protocol (SIP).

In other words, different embodiments of the invention allow the message validity information item to be added in a message on the basis of one of the communication protocols described above or to be ascertained from said message. In this way, the standard communication protocols can easily be used, during the actual connection setup or when controlling the half-duplex communication link using one of the communication protocols described above, to notify the server unit of the criterion which is to be taken as a basis for erasing the transmitted message, if appropriate.

In line with another embodiment of the invention, the telecommunication session message generation unit generates the telecommunication session message as a Talk Burst message or else as a Talk Burst Request message.

The telecommunication system may have a receiver which is a half-duplex telecommunication session server unit and provides a half-duplex telecommunication session between the telecommunication terminal and a further telecommunication terminal.

In this context, a telecommunication session may involve any number of telecommunication terminals, and a telecommunication link can therefore be set up between any number, including greater than two, of telecommunication terminals. In this case, a transmitted message may be stored as appropriate on a receiver-specific basis and may also be erased, if appropriate, on a receiver-specific basis.

If the message validity information item is a time-based validity information item then the telecommunication session server unit includes at least one timer, for example, which is provided for the telecommunication session message, possibly when there are a multiplicity of telecommunication terminals involved in the telecommunication session, with a respective timer being provided for each telecommunication terminal and for the respective telecommunication session message.

By way of example, the checking unit erases the telecommunication session message when the timer expires if the telecommunication session message or the other telecommunication session message has not yet been retrieved by a telecommunication session terminal addressed in the telecommunication session message or in the other telecommunication session message.

In one refinement of the telecommunication session server unit, the telecommunication session message may contain the message validity information item.

In addition, the telecommunication session message may contain media data.

In line with another refinement of the invention, the checking unit erases the telecommunication session message or the other telecommunication session message if the case indicated in a message validity information item contained in a telecommunication session message has arisen, generally if the telecommunication session message or the other telecommunication session message is invalid.

In line with one refinement of the invention, the checking unit erases the telecommunication session message or the other telecommunication session message from a communication right allocation queue or from a memory in the telecommunication session server unit if the case indicated in a message validity information item has arisen.

According to one embodiment of the invention the validity of the respective streaming messages is signalled and appropriate prescribable actions are derived therefrom in the course of a telecommunication session which has been provided and set up for the purpose of transmitting media data streams, in other words provided and set up as a media streaming application (Media Streaming Service). A media streaming application or a service of this kind is to be understood to mean an application or a service in which the media data to be transmitted are combined in a server unit or in a communication terminal to form at least one media data stream and are transmitted to at least one other telecommunication session subscriber as one media data stream.

Exemplary embodiments of the invention are shown in the figures and are explained in more detail below. In the figures, the same elements have been provided with identical reference symbols.

FIG. 1 shows a Push-to-Talk-over-Cellular telecommunication system 100 based on the Open Mobile Alliance (OMA) communication standard.

In this simplified example, the telecommunication system 100 has a first telecommunication terminal 101 (belonging to a first subscriber TA) and a second telecommunication terminal 102 (belonging to a second subscriber TB), between which subscribers a Push-to-Talk-over-Cellular communication link 105 has been set up. Each telecommunication terminal 101, 102 has a PoC client. The subscribers and hence the two telecommunication terminals 101, 102 do not communicate with one another directly, but rather with the aid of a central Push-to-Talk-over-Cellular server 103. The Push-to-Talk-over-Cellular server 103 has a Push-to-Talk-over-Cellular module 104 (PoC box) which has a memory which is used to buffer media messages for transmission which have been received by the PoC server 103—in this exemplary embodiment, without restricting general validity, voice messages—which cannot be transmitted to an addressed receiver telecommunication terminal—on the basis of this exemplary embodiment the second telecommunication terminal 102—in the course of a PoC communication link. The PoC module 104 is thus used as a voice message buffer store in the PoC server 103.

In these exemplary embodiments, two subscribers (a first subscriber TA and a second subscriber TB) participate in the PoC communication session. In other words, this exemplary embodiment involves a 1-to-1 PoC communication session (1-to-1 PoC session). In an alternative embodiment, any number of subscribers and hence any number of telecommunication terminals may be involved and registered in a PoC session.

The subscribers and hence the telecommunication terminals 101, 102 use audio information to communicate with one another. The PoC server 103 incorporates, as described above, the PoC module 104 which, as described above, is a type of voice mail box used to buffer PoC talk bursts when the receiver of voice messages, in this case the user of the second telecommunication terminal 102 (subscriber TB), in a PoC session, for example a 1-to-1 PoC session (generally a 1-to-M PoC session), cannot be reached.

In line with this embodiment of the invention, it is now assumed by way of example that the PoC communication session has just started and the first subscriber TA requests the talk right from the PoC server so as then to be able to transmit his talk burst, i.e. his voice data.

It is also assumed that the message to be transmitted by the first subscriber TA is a question to the second subscriber TB which is of interest to the second subscriber TB or else to the first subscriber TA only for a limited time, for example only of interest for a period of 10 minutes. In other words, this means that the first subscriber TA would like to have a response to his question to the second subscriber TB only within this time. After that, a response from the second subscriber TB to the question from the first subscriber TA is not of interest to the first subscriber TA (anymore). The first subscriber TA therefore configures the PoC client in the first telecommunication terminal 101, i.e. on his mobile radio telecommunication terminal, such that the validity period for the PoC message which is to be transmitted, in other words the validity period for the talk burst, is 10 minutes.

The check to determine the time at which a subscriber is permitted to send his PoC Talk Burst, i.e. the time at which a subscriber is allocated a talk right, is carried out using the Talk Burst Control Protocol (TBCP) in the form of RTCP (Real Time Transport Control Protocol) protocol messages based on the OMA communication standard.

FIG. 2 shows the steps of an exemplary embodiment of the invention which are executed by the first telecommunication terminal, i.e. by the first mobile radio terminal, in a flowchart 200.

In a first step (step 201), a PoC communication session (PoC session) is set up by the first telecommunication terminal 101, using its integrated PoC client, to the second telecommunication terminal 102 using the PoC server 103.

Once the PoC communication session has been set up, which is checked in step 202, it is assumed that the user of the first telecommunication terminal 101 uses the first telecommunication terminal 101 to request a talk right (step 203) using an appropriate talk right request message which is transmitted to the PoC server 103.

If the PoC server 103 allocates the first telecommunication terminal 101 an appropriate talk right, of which the first telecommunication terminal 101 is notified by means of an appropriate talk right allocation message, for example, and which is checked in a further checking step (step 204) in the first telecommunication terminal 101, then in a subsequent step (step 205) the voice signal spoken into the telecommunication terminal 101 by the first subscriber TA is recorded and one or more PoC voice message(s) is/are formed which contain(s) the recorded voice signal which has been spoken. The voice message(s) is/are also allocated a voice message validity information item, as is described in more detail below (step 206).

The voice message(s) formed in this way with the voice signal and the voice message validity information item is/are then sent from the first telecommunication terminal 101 to the PoC server 103, possibly using a participating PoC server for the PoC server 103 in the form of the controlling PoC server (step 207).

Once the first telecommunication terminal 101 has sent all the voice messages which have been spoken, i.e. once the relevant voice messages have been formed, and if the first subscriber TA does not wish to exercise his talk right further or when the time for which the talk right was transferred to him has elapsed, the first telecommunication terminal 101 transmits an appropriate talk right release message to the PoC server 103 and in this way releases the talk right (step 208).

A check is also performed to determine whether the PoC communication session has ended, i.e. in other words whether the PoC server 103 has terminated the PoC communication session with an appropriate PoC communication session termination message. If this is not the case then the method is possibly continued in the first telecommunication terminal 101 in step 203, in which, if required, a talk right for the first subscriber TA is again requested from the PoC server 103. While the first telecommunication terminal 101 is not requesting a talk right or is not being provided with one, the first telecommunication terminal 101, and also all the other telecommunication terminals involved in the telecommunication session, i.e. participating in it, receives the voice data from that telecommunication terminal which has currently been allocated the talk right.

When the PoC communication session is intended to be terminated ("yes" in step 209), the PoC communication session is cleared in the first telecommunication terminal 101 (step 210).

FIG. 3 shows the method steps which correspond to the steps shown in FIG. 2 and which are carried out in the PoC server 103 in a flowchart 300 for the server.

When the PoC communication session 301 has been set up between the first subscriber TA and the second subscriber TB, in other words between the two telecommunication terminals 101, 102, the setup of the PoC session being checked in a checking step 302, the PoC server 103 receives a talk right request message (step 303), in line with this exemplary embodiment from the first telecommunication terminal 101, after the PoC communication session has been set up.

In a subsequent step, a check is performed (checking step 304) to determine whether the talk right for the PoC communication session is to be granted to the first telecommunication terminal 101.

If a talk right is not to be granted to the first telecommunication terminal 101 ("no" in checking step 304) then an appropriate talk right rejection message is transmitted to the first telecommunication terminal 101, notifying the first telecommunication terminal 101 that the requested talk right is not being granted (step 312).

If the talk right is granted ("yes" in step 304), then an appropriate talk right allocation message about the talk right being granted is transmitted to the first telecommunication terminal 101, and one or more appropriate voice message(s) is/are then received from the first telecommunication terminal 101 (step 305).

The PoC server 103 now checks whether it is possible to forward the voice message(s) to the second subscriber TB, i.e. to the second telecommunication terminal 102, i.e., in other words whether the second telecommunication terminal 102 can be reached for the purpose of transmitting the voice message(s). If this is the case ("yes" in step 306) then the PoC server 103 forwards the received voice message(s) to the second telecommunication terminal 102 (step 307).

If this is not possible ("no" in step 306), then the voice message(s) is/are stored in the Poc module 104, i.e. in a memory in the PoC server 103 (step 308).

In addition, a (respective) voice message validity information item is ascertained from the voice message(s) (step 309), for example by parsing the voice message(s), and a check is performed to determine whether or not the voice message(s) is/are valid. By way of example, there is thus a check to determine whether or not a period which is indicated in the (respective) voice message as a validity period for the voice message has already expired (step 310).

If the voice message is not valid based on the ascertained voice message validity information item ("no" in step 310) then the voice message is erased from the Poc module 104 (step 311) and the method continues in step 303, in which the PoC server 103 continues to expect and receive talk right requests.

If the voice message is still valid when the check has been performed and therefore does not require erasing. Checking step 310 is performed repeatedly at prescribable intervals of time or continuously until either the voice message has been retrieved from the PoC box by the second telecommunication terminal 102 or, by way of example, the period for which the voice message is intended to be valid has expired and the voice message is therefore erased from the PoC module 104. If there are a plurality of voice messages stored in the PoC module 104 then checking step 310 is carried out for each voice message in the manner described above. In addition, the PoC server 103 moves to step 303, in which it receives and appropriately handles talk right request messages, as has been described above.

As FIG. 2 shows in step 206, the first telecommunication terminal 101 forms the voice message with the voice signal and adds the voice message validity information item to the voice message.

This can be done in different ways according to the use of an appropriate communication protocol, the text below presenting two different variants when using the Real Time Control Protocol.

However, it should be stated in this connection that the time-based validity information item in the voice message can firstly be transmitted to the PoC server 103 using the RTCP, as explained in more detail below, but in alternative embodiments of the invention there is provision for the time-based validity information item to be transmitted using another communication protocol, which is used for PoC, generally for a half-duplex method within the context of the telecommunication, such as using the Binary Floor Control Protocols (BFCP) or the Session Initiation Protocols (SIP).

Figure 4:
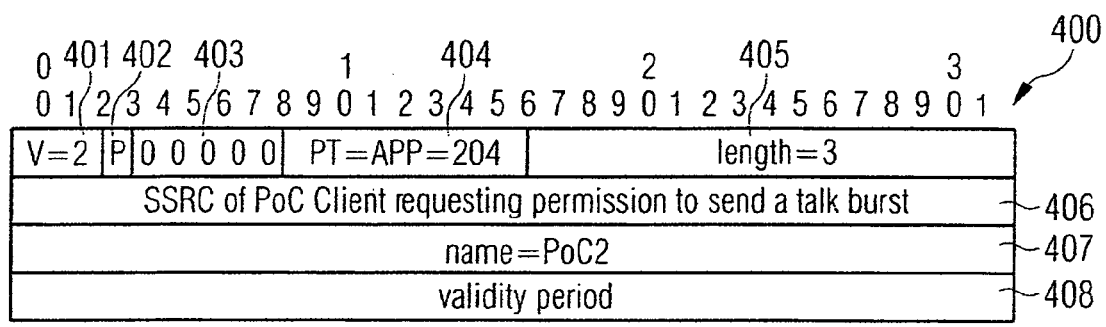
FIG. 4 shows a message format for an RTCP message "Talk_Burst_Request" based on a first exemplary embodiment of the invention.

If the time-based validity information item is added to the voice message using RTCP in the first telecommunication terminal 101 by means of the PoC client then in line with a first variant the validity information item configured by the first subscriber TA in the first telecommunication terminal 101, i.e. a validity period, is added to an RTCP message "Talk_Burst_Request" 400 (cf. FIG. 4). The first subscriber TA and hence the first telecommunication terminal 101 use the RTCP message "Talk_Burst_Request" 400 to request the talk right from the PoC server 103.

The data format of the RTCP message "Talk_Burst_Request" 400 is shown in more detail in FIG. 4.

The RTCP message "Talk_Burst_Request" 400 in line with this exemplary embodiment of the invention has the following fields:
  a version field 401:
    RTP version number (in this exemplary embodiment V=2);
  a padding field P 402:
    indicator for padding;
  a subtype field 403:
    subtype for the message, where "00000" denotes a "Talk_Burst_Request";
  an application definition field 404;
    indicator for application-defined RTCP message (in this exemplary embodiment PT=APP=204);
  a message length field 405:
    length of the message after the length field in words (32 bits); in this exemplary embodiment the length field has the value length=3,
  a synchronization field 406 (SSRC):
    synchronization source for the PTT server; the SSRC identifies the sender of media streams distinctly; it is defined in the RTP packets belonging to the RTCP message,
  a name field 407:
    application-defined message name (for PoC2=PTT over Cellular Version 2), and
  a validity information item field 408 (Validity Period):
    validity period for the talk burst which is to be transmitted; when the indicated validity period has expired the talk burst in the Poc module 104 of the PoC server 103 can be discarded, i.e. erased.

Figure 5:
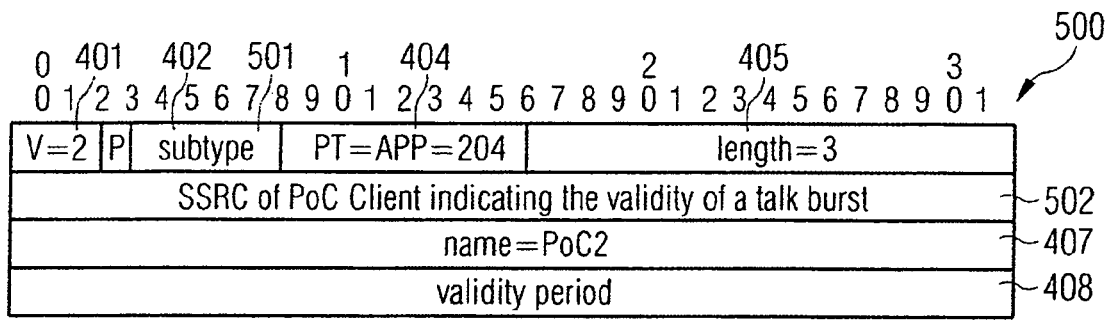
FIG. 5 shows a message format for an RTCP message "Talk_Burst_Validity_Period" based on a second exemplary embodiment of the invention.

In line with a second embodiment of the invention, which is shown in FIG. 5, a freshly defined RTCP message "Talk_Burst_Validity_Period" 500 is provided for indicating the validity period for the talk burst which is to be transmitted.

In this variant, the PoC client on the first telecommunication terminal 101 adds the validity information item configured by the first subscriber TA to a freshly defined RTCP message "Talk_Burst_Validity_Period" 500. This message is then sent to the PoC server 103 separately. The relevant data format for the RTCP message "Talk_Burst_Validity_Period" 500 is shown in FIG. 5 and is explained in more detail below:
  a version field 401:
    RTP version number (in this exemplary embodiment V=2);
  a padding field P 402:
    indicator for padding;
  a subtype field 501:
    the subtype for the message, where a value signifying "Talk_Burst_Validity_Period" which has not yet been used by the TBCP up to this time is assigned,
  an application definition field 404:
    indicator for application-defined RTCP message (in this exemplary embodiment PT=APP=204);
  a message length field 405:
    length of the message after the length field in words (32 bits); in this exemplary embodiment the length field has the value length=3,
  a synchronization field 502 (SSRC):
    synchronization source for the PTT server; the SSRC identifies the sender of media streams distinctly; it is defined in the RTP packets belonging to the RTCP message; in this case the field indicates whether the talk burst is valid,
  a name field 407:
    application-defined message name (for PoC2=PTT over Cellular Version 2), and
  a validity information item field 408 (Validity Period):
    validity period for the talk burst which is to be transmitted; when the specified validity period has expired the talk burst in the PoC module 104 of the PoC server 103 can be discarded, i.e. erased.

As described above, it is assumed in this exemplary embodiment of the invention that the second subscriber TB cannot be reached. However, as described above, the first subscriber TA speaks a message into the PoC module 104 of the PoC server 103, i.e. an appropriate talk burst is sent from the first subscriber TA, i.e. from the first telecommunication terminal 101, to the PoC module 104 in the PoC server 103.

In the PoC server 103, particularly in the PoC module 104, a timer associated with the voice message is started for the received voice message when the voice message is stored in the Poc module 104 and after the validity information item has been ascertained in the form of a time-based validity period on the voice message. In this case, the starting value of the timer is the same as the time-based validity information item which was previously configured by the first subscriber and which was added to the voice message and sent to the PoC server 103, namely the validity period described above.

If the timer expires before the second subscriber TB can be reached again, the talk burst stored in the PoC module 104 is discarded, i.e. erased.

The first subscriber TA can then (optionally) receive a transmitted notification from the first PoC server 103 informing him that the second subscriber TB has not been reached within the validity period prescribed by the first subscriber TA and the PoC message buffer-stored in the PoC module 104 has been erased.

If the receiver of the voice message cannot be reached then a timer needs to be initialized, in the PoC server 103 or in the PoC module 104, whose starting value is equal to the time-based validity information item sent by the sending subscriber in the PoC message. If this timer expires before the receiver has been reached, the PoC talk burst in the PoC server 103 or in the PoC module 104 needs to be discarded, i.e. erased.

Optionally, as described above, the sending subscriber can then be sent notification from the PoC server 103 that the second subscriber TB has not been reached within the validity period and hence the PoC message has been erased.

In an alternative embodiment of the invention, the media data validity information item is used to check whether a communication right request message to which the media data validity information item relates, for example a talk right request message, for example a Talk Burst Request message, which communication right request message is (buffer) stored in a communication right request message queue in a PoC server unit, is still valid and whether it possibly needs to be erased. If the result of the check is that the communication right request message, generally the telecommunication session message to which the media data validity information item relates, needs to be erased, in other words is invalid on the basis of the media data validity information item, then the communication right request message is erased.

In another alternative embodiment of the invention, when or after the communication right request message is edited and possibly after the communication right is allocated, but before the media data are stored for the associated communication right to the PoC box, generally the PoC server, for example, the media data are not stored in the PoC box or the PoC server or are erased again in real time.

The invention claimed is:

1. A telecommunication terminal comprising:
   a telecommunication session unit adapted to perform at least one of setting up a Push-to-Talk telecommunication session and controlling a Push-to-Talk telecommunication session;
   a telecommunication session message generation unit adapted to generate a telecommunication session message during an established Push-to-Talk telecommunication session;
   a telecommunication session message transmission unit adapted to send the telecommunication session message during the established Push-to-Talk telecommunication session; wherein
   the telecommunication session message generation unit is adapted to add to at least one telecommunication session message generated during the established Push-to-Talk telecommunication session, a message validity information item indicating whether and until when the telecommunication session message or another telecommunication session message identified in the telecommunication session message is valid.

2. The telecommunication terminal according to claim 1, wherein the telecommunication session message generation unit is a telecommunication session media message generation unit generating a telecommunication session media message.

3. The telecommunication terminal according to claim 2, wherein the telecommunication session media message contains media data.

4. The telecommunication terminal according to claim 1, wherein the message validity information item further indicates in what case the telecommunication session message or the other telecommunication session message needs to be erased in a receiver of the telecommunication session message or of the other telecommunication session message.

5. The telecommunication terminal according to claim 1, wherein the telecommunication session message is a telecommunication session signaling message.

6. The telecommunication terminal according to claim 5, wherein the telecommunication session signaling message is a right request message.

7. The telecommunication terminal according to claim 1, wherein
   the telecommunication session unit is further adapted for setting up and/or controlling a Push-to-Talk telecommunication session.

8. The telecommunication terminal according to claim 7, wherein the Push-to-Talk telecommunication session is a Push-to-Talk-over-Cellular telecommunication session.

9. The telecommunication terminal according to claim 1, wherein
   the message validity information item further comprises: a prescribed time period after whose expiry the telecommunication session message or the other telecommunication session message needs to be erased if an addressed telecommunication terminal does not retrieve the telecommunication session message or the other telecommunication session message from the server unit.

10. The telecommunication terminal according to claim 1, wherein
    the message validity information item further comprises:
    a spatial information item indicating that the telecommunication session message or the other telecommunication session message needs to be erased if an addressed telecommunication terminal is not in the local area indicated by the message validity information item.

11. The telecommunication terminal according to claim 1, wherein
    the message validity information item further comprises:
    a subject-related information item indicating that the telecommunication session message or the other telecommunication session message needs to be erased if a user of an addressed telecommunication terminal has no information regarding the indicated subject.

12. The telecommunication terminal according to claim 1, wherein
    the message validity information item further comprises:
    an information item indicating that the telecommunication session message or the other telecommunication session message needs to be erased if a user of an addressed telecommunication terminal is not registered or not ready to receive in the mobile radio communication network.

13. The telecommunication terminal according to claim 1, wherein
    the telecommunication session message is generated based on one of the following communication protocols:
    Real Time Transport Protocol;
    Real Time Transport Control Protocol;
    Binary Floor Control Protocol; and
    Session Initiation Protocol.

14. The telecommunication terminal according to claim 1, wherein the telecommunication session message is generated as a Talk Burst message.

15. A telecommunication system, having a telecommunication terminal, comprising:
    a Push-to-Talk telecommunication session unit adapted to set up and/or control a Push-to-Talk telecommunication session,
    a telecommunication session message generation unit adapted to generate a telecommunication session message during an established Push-to-Talk telecommunication session; and
    a telecommunication session message transmission unit adapted to send the telecommunication session message during the established Push-to-Talk telecommunication session; wherein the telecommunication session message generation unit adapted to add to the at least one generated telecommunication session message generated during the established Push-to-Talk telecommunication session, a message validity information item indicating whether and until when the telecommunication session message or another telecommunication session message identified in the telecommunication session message is valid.

16. The telecommunication system according to claim 15, wherein
the Push-to-Talk telecommunication session server unit is adapted to provide a Push-to-Talk telecommunication session between the telecommunication terminal and a further telecommunication terminal.

17. A telecommunication session server unit providing a telecommunication session between a plurality of telecommunication terminals, the telecommunication session server unit comprising:
a control unit adapted to control an established Push-to-Talk telecommunication session between a plurality of telecommunication terminals;
a receiver unit adapted to receive a telecommunication session message during the established Push-to-Talk telecommunication session, wherein the telecommunication session message is generated during the established Push-to-Talk telecommunication session;
a memory adapted to store the received telecommunication session message; and,
a checking unit adapted to check, during the established Push-to-Talk telecommunication session, whether and until when the telecommunication session message or another telecommunication session message identified in the telecommunication session message is valid.

18. The telecommunication session server unit according to claim 17, wherein the checking unit is further adapted to check the validity of the telecommunication session message or of the other telecommunication session message using an included message validity information item.

19. The telecommunication session server unit according to claim 18, wherein the telecommunication session message contains the message validity information item.

20. The telecommunication session server unit according to claim 18, further comprising:
at least one timer associated with the telecommunication session message, the timer adapted to be set based on the message validity information item, wherein
the checking unit is further adapted to erase the telecommunication session message when the timer expires if the telecommunication session message or the other telecommunication session message has not yet been retrieved by a telecommunication terminal addressed in the telecommunication session message or in the other telecommunication session message.

21. The telecommunication session server unit according to claim 17, wherein the checking unit is further adapted to erase the telecommunication session message or the other telecommunication session message if the case indicated in a message validity information item has arisen.

22. The telecommunication session server unit according to claim 21, wherein the checking unit is further adapted to erase the telecommunication session message or the other telecommunication session message from a communication right allocation queue or from a memory in the telecommunication session server unit if the case indicated in a message validity information item has arisen.

23. The telecommunication session server unit according to claim 17, wherein the telecommunication session message contains media data and forms a telecommunication session media message.

24. A method of generating and sending a telecommunication session message during an established Push-to-Talk telecommunication session between a plurality of telecommunication terminals, the method comprising:
generating a telecommunication session message during the established Push-to-Talk telecommunication session, the telecommunication session message having a message validity information item indicating whether and until when the telecommunication session message or another telecommunication session message identified in the telecommunication message is valid; and
sending the telecommunication session message during the established Push-to-Talk telecommunication session.

25. A method of managing a telecommunication session media message during an established Push-to-Talk telecommunication session between a plurality of telecommunication terminals, the method comprising:
receiving a telecommunication session message during the established Push-to-Talk telecommunication session, the telecommunication session message generated during the established Push-to-Talk telecommunication session and containing a message validity information item indicating whether and until when the telecommunication session message or another telecommunication session message identified in the telecommunication session message is valid;
storing the message validity information item from the telecommunication session message; and
checking whether or until when the telecommunication session message or the other telecommunication session message is valid.

26. The method according to claim 25, further comprising:
the message validity information item based on to checking whether the telecommunication session message or the other telecommunication session message needs to be erased; and
erasing the telecommunication session media message or the other telecommunication session message if the telecommunication session media message or the other telecommunication session message needs to be erased.

27. A non-transitory computer-readable storage medium storing a computer program for the purpose of generating and sending a telecommunication session message during an established Push-to-Talk telecommunication session between a plurality of telecommunication terminals, the computer program instructions comprising:
generating a telecommunication session message during the established Push-to-Talk telecommunication session, the telecommunication session message having a message validity information item indicating whether and until when the telecommunication session message or another telecommunication session message identified in the telecommunication session message is valid; and
sending the telecommunication session message during the established Push-to-Talk telecommunication session,
when the computer program runs on a computer.

28. A non-transitory computer-readable storage medium storing a computer program for the purpose of managing a telecommunication session message during an established Push-to-Talk telecommunication session between a plurality of telecommunication terminals, the computer program instructions comprising:

storing a telecommunication session message received during the established Push-to-Talk telecommunication session, the telecommunication session message generated during the established Push-to-Talk telecommunication session and containing a message validity information item indicating whether and until when the telecommunication session message or another telecommunication session message identified in the telecommunication session message is valid, when the computer program runs on a computer.

29. A non-transitory computer-readable storage medium having a computer program element for generating and sending a telecommunication session message during an established Push-to-Talk telecommunication session between a plurality of telecommunication terminals, the computer program element comprising:

generating a telecommunication session message during the established Push-to-Talk telecommunication session, the telecommunication session message having a message validity information item added to it indicating whether or and until when the telecommunication session message or another telecommunication session message identified in the telecommunication session message is valid; and sending the telecommunication session media message during the established Push-to-Talk telecommunication session, when the computer program element runs on a computer.

30. A non-transitory computer-readable storage medium having a computer program element for managing a telecommunication session message during an established Push-to-Talk telecommunication session between a plurality of telecommunication terminals, the computer program element comprising:

sharing a received telecommunication session message during the established Push-to-Talk telecommunication session, the telecommunication session message generated during the established Push-to-Talk telecommunication session and containing a message validity information item indicating whether and until when the telecommunication session message or another telecommunication session message identified in the telecommunication session message is valid, asserting the message validity information item from the telecommunication session message, the message validity information item based on checking whether or until when the telecommunication session message or the other telecommunication session message is valid, when the computer program element runs on a computer.

\* \* \* \* \*